Figure 1:
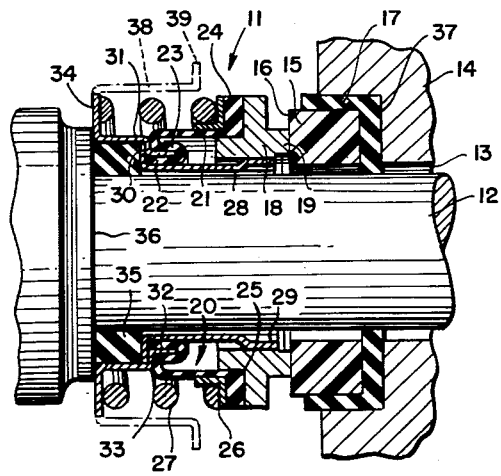

Aug. 1, 1961

L. N. DOLHUN ET AL 2,994,547

SEAL

Filed March 26, 1958

INVENTORS:—
LEONARD N. DOLHUN
RICHARD J. HICKS
BY:—
Marzall, Johnston, Cook & Root
ATT'YS :::
United States Patent Office 2,994,547
Patented Aug. 1, 1961

2,994,547
SEAL
Leonard N. Dolhun, Rockford, and Richard J. Hicks, Sparta, Mich., assignors to Muskegon Piston Ring Company, Muskegon, Mich., a corporation of Michigan
Filed Mar. 26, 1958, Ser. No. 724,176
9 Claims. (Cl. 286—11.13)

The present invention relates in general to shaft seals, and has more particular reference to the provision of improved means for sealing rotating shafts against fluid leakage along the shaft past the seal.

An important object of the present invention is to provide an improved seal of simplified construction and unusually efficient operating characteristics.

A further object of the invention is to provide a bearing seal that can be readily secured in position on the shaft and as easily removed, without disturbing the shaft or its bearing, or other associated parts.

Another important object of the invention is to provide a flexible sealing member, as a shaft seal component, which may freely permit relative longitudinal movement or end play between the shaft and a stationary wall or bearing through which the shaft extends.

A further object of the invention is to provide a self-contained seal unit adapted to be applied as a shaft seal.

The foregoing and numerous other important objects, advantages, and inherent functions of the invention will become apparent as the same is more fully understood from the following description, which, taken in connection with the accompanying drawings, discloses preferred embodiments of the invention.

Figure 2:
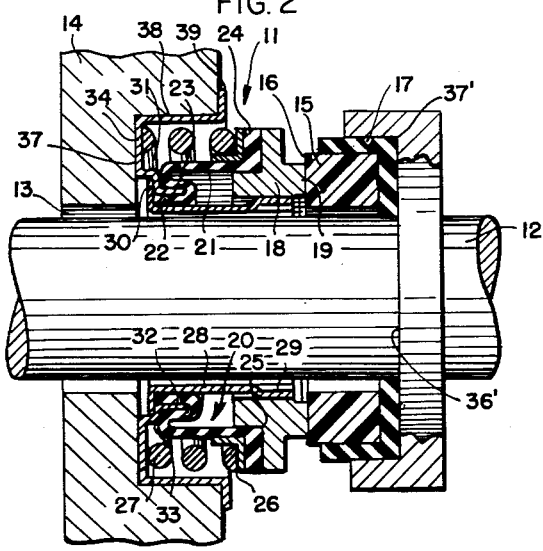

Referring to the drawings:

FIG. 1 is a sectional view through a shaft seal structure embodying the present invention; and FIG. 2 is a similar sectional view taken through a modified structure embodying the invention.

To illustrate the invention each of the figures of the drawings shows a shaft seal assembly 11 for use on a shaft 12, in order to seal the same against leakage along the shaft, as through an opening 13 in a member 14 through which the shaft extends. As shown, the member 14 may comprise a wall, in the opening 13 of which the shaft is turnably mounted, although the member 14 may equally well form the wall portion of a structure which is turnably mounted for rotation on the shaft.

Each of the seal assemblies 11 preferably comprises a ring member 15 forming a circular seal seat 16, means being provided for mounting the member 15 in position concentrically encircling the shaft, including a packing gasket 17 preferably comprising neoprene or other synthetic rubber-like material. Each seal assembly 11 also preferably comprises a sealing ring 18 sized to loosely encircle the shaft, said seal ring having a circular portion 19, on one side, adapted for running engagement with the seat 16, the facing surfaces of the seat 16 and of the seat engaging ring portion 19 being accurately finished to provide highly polished flat surfaces adapted to form a running seal, the one against the other.

The seal ring 18 and its cooperating seal seat 16 may comprise any suitable wearing or bearing materials, including metal, carbon, graphite, plastic, and other synthetic and ceramic materials, although it is preferable to form one of the members 15 and 18 of material which is softer and which wears more readily than the material of the other, so that one member may take the operational wear while the cooperating member may remain substantially unworn. To this end, it is desirable to form the ring 18 and particularly the bearing portions 19 thereof of material relatively softer than the material of the seat forming ring 15. The seat forming member 15, therefore, may conveniently comprise ceramic material or other relatively hard, long wearing seat forming material, while the bearing portions 19 of the seal ring may comprise carbon or other suitable wearing material adapted for sealing engagement with the seat forming member 15.

Associated with the seal ring 18, the assembly may embody a sleeve-like gasket element 20, preferably formed of resilient rubber-like material, such as neoprene, synthetic rubber, or other flexible gasket material. The gasket forms a diaphragm of generally S-shaped configuration in radial section, the same having an outer wall portion 21 at one end of the gasket, a concentrically disposed inner wall portion 22 at its other end, and an intermediate wall portion 23 having opposite edges curvingly and flexibly connected respectively with the end portions 21 and 22.

The terminal edge of the outer gasket portion 21, remote from the connecting portion 23, may be provided with an integral outstanding circular flange 24 adapted to sealingly seat upon the ring 18, which may be formed with a peripheral groove 25 for seatingly receiving the flange 24. A preferably sheet metal collar or ring 26 may be assembled around the gasket portion 21 in position seating upon the side of the flange 24 remote from the seal ring 18, said collar serving to receive the thrust of a compression spring 27 to squeeze the flange 24 into sealing engagement in the seat 25 of the seal ring, and for yieldingly urging the seal ring into running engagement with the seat forming ring 15.

The seal ring 18 is sized to embrace a preferably sheet metal cylindrical shell 28 adapted to receive the shaft freely therethrough, said shell being formed at one end, as at 29, for splined connection with the seal ring 18, whereby to prevent relative rotation of the ring with respect to the shell while permitting free axial movement of the ring thereon. The shell 28 at one end extends outwardly of the ring, on the side thereof remote from the seat forming ring 15, said outwardly extending end of the shell being formed with an outstanding flange 30. The shell provides a seat for the inner gasket portion 22 adjacent the outstanding flange 30.

The gasket portion 22 is sealingly pressed upon the gasket seat and held in place thereon by means of a collar or gland comprising a preferably sheet metal shell 31, having an end portion 32 forming a gasket clamping flange sized to squeezingly press the gasket portion 22 upon the seat formed in the sleeve 28 adjacent the flange 30. The gasket clamping shell or gland 31 is also formed with an offset portion 33 forming a seat sized to press fittingly receive the peripheral edge of the flange 30, whereby the shells 28 and 31 may be press fitted together in position clampingly securing the gasket portion 22 between the clamping flange 32 and the gasket seat formed by the shell 28 adjacent the flange 30. The shell or collar 31, at the end thereof remote from the clamping flange 32, is formed with an outstanding flange portion 34 adapted to form a seat for an end of the compression spring 27, remote from the seal ring 18. Accordingly, the opposite ends of the compression spring may press yieldingly in opposite directions upon the flange 34 and the thrust collar 26.

The foregoing seal structure may be applied on a shaft to be sealed in manner such that the seat forming ring 15 and the shaft are relatively turnable, while the sealing ring 18 and the components associated therewith, including the flexible gasket or diaphragm, the mounting shells 28 and 31, and the spring 27, are mounted on the shaft to turn therewith, as shown more particularly in FIG. 1; or the seat forming ring 15 may be mounted on the shaft to turn therewith, while the shaft is relatively turnable with respect to the sealing ring 18 and its associated components, as shown in FIG. 2.

Where the ring and its associated components are to be mounted for turning movement with the shaft, as shown in FIG. 1, the shell 31 may be configured to form a pocket for receiving a friction ring 35 of resilient packing material, such as neoprene, synthetic rubber, or other suitable packing material, whereby the shells 28 and 31 are sealingly and frictionally secured to the shaft, as at a shaft shoulder 36, the seat forming ring 15 and its packing gasket 17 being supported in a seat 37 formed in the wall member 14 around the opening 13 therein through which the shaft extends.

Where it is desired to mount the seat forming ring 15 for turning movement with the shaft, the shell 31 may be formed with a cylindrical wall 38 encircling the spring 27 and joined preferably integrally at one end with the peripheral edge of the flange portion 34, the other end of the cylindrical wall 38 being preferably formed with an outwardly extending flange 39. Accordingly, the shell 31 may be pressingly mounted in the seat 37 of the member 14, through the opening 13 of which the shaft turnably extends; and the seal ring, with its packing gasket, may be sealingly received against a shoulder 36' formed on the shaft or in a pocket 37' formed on such shoulder.

If desired, the shell 31, as indicated in dotted lines in FIG. 1, may be formed with the cylindrical wall 38 and also to provide the pocket for receiving the shaft mounting gasket 35, so that the structure may be employed at will either with the seal ring 18 and its associated components mounted on the shaft for turning movement therewith, as shown in FIG. 1, or for relative turning movement with respect to the shaft as shown in FIG. 2. It is, however, normally more expedient to eliminate the wall portion 38 in embodiments in which the sealing ring 18 and its associated components are adapted for turning movement with the shaft, as shown in FIG. 1, and to eliminate the shaft mounting gasket pocket in embodiments in which the sealing ring 18 and associated components are adapted for relative turning movement with respect to the shaft, as shown in FIG. 2.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. A seal for relatively turnable shaft and associated frame members having a seal seat on one of the members and a mounting seat on the other comprising a sleeve sized to freely receive said shaft member, mounting means to secure the sleeve on said mounting seat, said mounting means comprising a collar press fitted upon said sleeve and having a mounting seat engaging poriton, a sealing ring surrounding the sleeve in position to make running contact with said seal seat, a flexible sleeve-like gasket encircling said sleeve and having a sleeve portion of resilient compressible material at one end, a clamping flange on said mounting means pressing said sleeve portion of the gasket sealingly upon the sleeve, the opposite end of said gasket being sealed on said sealing ring, and a compression spring bearing in opposite directions upon said sealing ring and said mounting means to press the ring upon said seal seat.

2. A seal for relatively turnable shaft and associated frame members having a seal seat on one of the members and a mounting seat on the other comprising a sleeve sized to freely receive said shaft member, mounting means to secure the sleeve on said mounting seat, said mounting means comprising a collar press fitted upon said sleeve and having a mounting seat engaging portion, a sealing ring surrounding the sleeve in position to make running contact with said seal seat, a flexible sleeve-like gasket encircling said sleeve and having a sleeve portion of resilient compressible material at one end, a clamping flange on said mounting means pressing said sleeve portion of the gasket sealingly upon the sleeve, the opposite end of said gasket being sealed on said sealing ring, said mounting means being formed with an outstanding flange, and a compression spring bearing in opposite directions upon said sealing ring and said flange to press the ring upon said seal seat.

3. A seal for relatively turnable shaft and associated frame members having a seal seat on one of the members and a mounting seat on the other comprising a sleeve sized to freely receive said shaft member, mounting means to secure the sleeve on said mounting seat, said mounting means comprising a collar press fitted upon said sleeve and having a mounting seat engaging portion, a sealing ring surrounding the sleeve in position to make running contact with said seal seat, a flexible sleeve-like gasket encircling said sleeve and having a sleeve portion of resilient compressible material at one end, a clamping flange on said mounting means pressing said sleeve portion of the gasket sealingly upon the sleeve, the opposite end of said gasket being sealed on said sealing ring, said mounting means forming a circumferential pocket facing radially inwardly upon said shaft member, a resilient packing ring squeezed in said pocket to secure the mounting means on said shaft member, and a compression spring bearing in opposite directions upon said sealing ring and said clamping mounting means to press the ring upon said seal seat.

4. A seal for relatively turnable shaft and associated frame members having a seal seat on one of the members and a mounting seat on the other comprising a sleeve sized to freely receive said shaft member, a sealing ring surrounding the sleeve in position to make running contact with said seal seat, a flexible sleeve-like gasket encircling said sleeve and having a sleeve portion of resilient compressible material at one end, including a clamping collar press fitted upon said sleeve in position pressing said sleeve portion of the gasket sealingly upon the sleeve, the opposite end of said gasket being sealed on said sealing ring, said collar being formed with a spring seating portion, and a compression spring bearing in opposite directions upon said sealing ring and said seating portion to press the ring upon said seal seat.

5. A seal for relatively turnable shaft and associated frame members having a seal seat on one of the members and a mounting seat on the other comprising a sleeve sized to freely receive said shaft member, a sealing ring surrounding the sleeve in position to make running contact with said seal seat, a flexible sleeve-like gasket encircling said sleeve and having a sleeve portion of resilient compressible material at one end, including a clamping collar press fitted upon said sleeve in position pressing said sleeve portion of the gasket sealingly upon the sleeve, the opposite end of said gasket being sealed on said sealing ring, said collar including peripheral box portions forming a hollow circumferential cavity opening toward said sealing ring, said box portions being sized for press fitting engagement in said mounting seat, and a compression spring extending at one end in said box portions and bearing in opposite directions upon said sealing ring and said clamping collar to press the ring upon said seal seat.

6. A seal for relatively turnable shaft and associated frame members having a seal seat on one of the members and a mounting seat on the other comprising a sleeve sized to freely receive said shaft member, a sealing ring surrounding the sleeve in position to make running contact with said seat, a flexible sleeve-like gasket encircling said sleeve and having a sleeve portion of resilient compressible material at one end, a clamping collar press fitted upon the sleeve and having a clamping flange pressing said sleeve portion of the gasket sealingly upon the sleeve, the opposite end of said gasket being sealed on said sealing ring, said gasket having an intermediate folded portion, and a compression spring bearing in opposite directions upon said sealing ring and said clamping collar to press the ring upon said seal seat.

7. A seal for relatively turnable shaft and associated frame members having a seal seat on one of the members and a mounting seat on the other comprising a sleeve sized to freely receive said shaft member, a sealing ring surrounding the sleeve in position to make running contact with said seal seat, a flexible sleevelike gasket encircling said sleeve and having a sleeve portion of resilient compressible material at one end, a clamping collar press fitted upon the sleeve and having a clamping flange pressing said sleeve portion of the gasket sealingly upon the sleeve, an integral flange portion formed at the opposite end of the gasket in position overlying the seal seat remote side of the sealing ring, said clamping collar providing a spring seat outwardly of said clamping flange, and a compression spring bearing in opposite directions on said spring seat and flange portion to press the flange portion sealingly on the ring and the ring upon the seal seat.

8. A seal for relatively turnable shaft and associated frame members having a seal seat on one of the members and a mounting seat on the other comprising a sleeve sized to freely receive the shaft member, a sealing ring surrounding the sleeve and having splined connection therewith in position to make running contact with said seal seat, a flexible sleeve-like gasket encircling said sleeve and having an inner cylindrical portion of resilient compressible material at one end, an intermediate folded portion disposed radially outwardly of said cylindrical portion, and an outer cylindrical portion disposed radially outwardly of the folded portion whereby the inner and outer cylindrical portions and the folded portion are of S-shaped sectional configuration radially of the shaft, a clamping collar having an offset portion press fittingly secured on said sleeve and having a flange pressing the inner cylindrical portion of the gasket sealingly upon the sleeve, the outer cylindrical portion of the gasket being sealingly secured upon and circumferentially of the sealing ring, and a compression spring bearing in opposite directions upon said sealing ring and said clamping collar to press the ring upon said seal seat.

9. A seal for relatively turnable shaft and associated frame members having a seal seat on one of the members and a mounting seat on the other comprising a sleeve sized to freely receive the shaft member, a sealing ring surrounding the sleeve in position to make running contact with said seal seat, the ring having splined driving connection with the sleeve at an end thereof, the sleeve having an outwardly turned peripheral flange at its opposite end, a flexible sleeve-like gasket encircling said sleeve and having a sleeve portion of resilient compressible material at one end, a clamping collar having an offset portion forming a shoulder press fitted upon and secured to the peripheral edge of said outwardly turned flange, said clamping collar being formed with a clamping flange surrounding the sleeve adjacent said outwardly turned flange in position pressing said sleeve portion of the gasket sealingly upon the sleeve adjacent the outwardly turned flange, the opposite end of said gasket being sealed on said sealing ring, said gasket having an intermediate folded portion, and a compression spring bearing in opposite directions upon said sealing ring and said clamping collar outwardly of said shoulder forming offset portion to press the ring upon said seal seat.

References Cited in the file of this patent

UNITED STATES PATENTS

| | | |
|---|---|---|
| 1,950,852 | Kuehn | Mar. 13, 1934 |
| 2,027,505 | Winkler | Jan. 14, 1936 |
| 2,233,599 | Gilbert | Mar. 4, 1941 |
| 2,462,280 | Payne | Feb. 22, 1949 |
| 2,474,123 | Schmitz | June 21, 1949 |
| 2,556,133 | Bright | June 5, 1951 |

FOREIGN PATENTS

| | | |
|---|---|---|
| 644,185 | Great Britain | Oct. 4, 1950 |
| 896,876 | Germany | June 22, 1952 |